(12) United States Patent
Hadatsuki et al.

(10) Patent No.: US 9,860,365 B2
(45) Date of Patent: *Jan. 2, 2018

(54) PROVIDING SETTING ADJUSTMENTS TO A COMMUNICATION DEVICE

(75) Inventors: Naomi Hadatsuki, San Jose, CA (US); Hideaki Tanioka, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 375 days.

This patent is subject to a terminal disclaimer.

(21) Appl. No.: 13/429,174

(22) Filed: Mar. 23, 2012

(65) Prior Publication Data

US 2013/0249690 A1 Sep. 26, 2013

(51) Int. Cl.
*H04M 1/22* (2006.01)
*H04M 1/725* (2006.01)
*G08B 1/08* (2006.01)

(52) U.S. Cl.
CPC ........... *H04M 1/72569* (2013.01); *G08B 1/08* (2013.01); *H04M 1/22* (2013.01)

(58) Field of Classification Search
USPC ........................................................ 340/500
See application file for complete search history.

(56) References Cited

U.S. PATENT DOCUMENTS

| | | | |
|---|---|---|---|
| 6,544,200 B1 * | 4/2003 | Smith | A61B 5/1117 340/573.1 |
| 6,971,015 B1 * | 11/2005 | Falcon et al. | 713/182 |
| 7,088,234 B2 | 8/2006 | Naito et al. | |
| 8,219,028 B1 * | 7/2012 | Flamholz | G06F 1/1694 455/41.2 |
| 8,347,349 B1 * | 1/2013 | Wilson et al. | 726/1 |
| 8,620,218 B2 * | 12/2013 | Awad | H04B 5/0037 340/10.1 |
| 9,237,421 B2 * | 1/2016 | Dicke | H04M 1/72572 |
| 2004/0064575 A1 * | 4/2004 | Rasheed et al. | 709/232 |

(Continued)

FOREIGN PATENT DOCUMENTS

JP 2005-094647 A 4/2005
JP 2006-333166 A 12/2006

(Continued)

OTHER PUBLICATIONS

Krishnamurthy, Context-Based Adaptation of Mobile Phones Ussing Near-Field Communication, Jul. 21, 2006, IEEE, pp. 3-5.*

(Continued)

*Primary Examiner* — Ivan R Goldberg
*Assistant Examiner* — Venay Puri
(74) *Attorney, Agent, or Firm* — Maschoff Brennan

(57) ABSTRACT

According to an aspect of an embodiment, a method to effect automated adjustments at a communication device is described. The method may include receiving first contextual data of the communication device. The first contextual data may indicate conditions of a first predetermined setting at the communication device and a setting adjustment associated with the conditions. The method may also generate a second predetermined setting, based on the setting adjustment. The method may also apply the second predetermined setting at the communication device in place of the first predetermined setting under conditions indicated by second contextual data that are similar to conditions indicated by the first contextual data.

16 Claims, 4 Drawing Sheets

(56) References Cited

U.S. PATENT DOCUMENTS

| | | | |
|---|---|---|---|
| 2005/0111822 A1* | 5/2005 | Cho .................................. 386/46 |
| 2006/0019724 A1* | 1/2006 | Bahl et al. .................... 455/574 |
| 2006/0155854 A1* | 7/2006 | Selgert ......................... 709/227 |
| 2006/0277467 A1* | 12/2006 | Reponen et al. ............. 715/708 |
| 2007/0037610 A1* | 2/2007 | Logan ......................... 455/574 |
| 2007/0075965 A1* | 4/2007 | Huppi et al. ................. 345/156 |
| 2007/0171198 A1* | 7/2007 | Yokozawa .................... 345/156 |
| 2007/0185980 A1* | 8/2007 | Abraham ............ H04L 41/0816 709/222 |
| 2007/0197228 A1* | 8/2007 | McGary et al. ............. 455/445 |
| 2009/0325630 A1* | 12/2009 | Tiitola et al. .............. 455/550.1 |
| 2010/0013855 A1 | 1/2010 | Allen et al. |
| 2010/0275047 A1* | 10/2010 | Kaneko et al. ............. 713/323 |
| 2010/0281405 A1* | 11/2010 | Whattam ............... G06N 5/025 715/764 |
| 2011/0098029 A1* | 4/2011 | Rhoads et al. ............. 455/418 |
| 2011/0225368 A1* | 9/2011 | Burge, III .................... 711/118 |
| 2012/0030227 A1* | 2/2012 | Mital et al. ................. 707/767 |
| 2012/0083214 A1* | 4/2012 | Hashimoto ......... H04M 1/7253 455/41.2 |
| 2012/0099829 A1* | 4/2012 | Moberg et al. ............. 386/200 |
| 2012/0174212 A1* | 7/2012 | Dart et al. ...................... 726/19 |
| 2012/0260179 A1* | 10/2012 | Reshadi et al. .............. 715/735 |
| 2012/0326834 A1* | 12/2012 | Kennedy et al. .............. 340/3.1 |
| 2013/0012220 A1* | 1/2013 | Waris et al. ................... 455/450 |
| 2013/0019089 A1* | 1/2013 | Guidotti et al. .............. 713/100 |
| 2013/0065569 A1* | 3/2013 | Leipzig et al. ............... 455/416 |
| 2013/0078911 A1* | 3/2013 | Levien et al. ................... 455/39 |
| 2013/0268396 A1* | 10/2013 | Agevik et al. ............... 705/26.7 |
| 2015/0061862 A1* | 3/2015 | Lee ..................... H04M 1/7253 340/539.11 |
| 2015/0078296 A1* | 3/2015 | Son ........................ H04W 4/005 370/329 |
| 2017/0052698 A1* | 2/2017 | Seo ........................ G06F 1/1641 |

FOREIGN PATENT DOCUMENTS

| | | |
|---|---|---|
| JP | 2007-325158 A | 12/2007 |
| JP | 2011-077755 A | 4/2011 |
| JP | 2011-523840 A | 8/2011 |

OTHER PUBLICATIONS

Japanese Office Action for corresponding application No. 2013-059784, dated Aug. 30, 2016.

* cited by examiner

PROVIDING SETTING ADJUSTMENTS TO A COMMUNICATION DEVICE

Example embodiments discussed herein are related to providing setting adjustments to a communication device.

BACKGROUND

Settings of a communication device may typically be done manually by a user of the communication device. Once a setting is selected, the setting may be applied until the user changes the setting. A setting on a communication device may cause disturbances to the user of the communication device. For example, an alarm setting may be set to announce an audible alarm with a relatively high volume and may disturb the user when the level of ambient sound is relatively low.

In addition, the communication device may have a setting which may cause annoyances and/or disturbances to users of other communication devices within a predetermined proximity of the communication device. For example, an alarm setting may be set to announce an audible alarm which may disturb a user of a second communication device who is sleeping nearby.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method to effect automated adjustments at a communication device is described. The method may include receiving first contextual data of the communication device. The first contextual data may indicate conditions of a first predetermined setting at the communication device and a setting adjustment associated with the conditions. The method may also include generating a second predetermined setting based on the setting adjustment. The method may also include applying the second predetermined setting at the communication device in place of the first predetermined setting under conditions indicated by second contextual data that are similar to conditions indicated by the first contextual data.

The object and advantages of the embodiments will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to some embodiments described herein, automatic adjustments of settings on a communication device such as a cell phone may be implemented. Such automatic adjustments may allow a user to avoid inconvenience or annoyance. Automatic adjustments may be implemented by gathering contextual data related to usage and settings of the communication device in relation to environmental attributes in which the settings are designed to function. Contextual data may include environmental attributes such as time of day, ambient lighting, ambient sound, and the presence of other communication devices. Further, contextual data may also include data indicating an adjustment by the user in response to the automatic adjustment.

For example, a brightness setting of the communication device may be too bright at a time when the ambient lighting of the environment in which the communication device is located is too low compared to the brightness setting at the communication device. An automatic adjustment may allow the user to avoid an unnecessarily bright display by automatically adjusting the setting by comparing the ambient lighting to the brightness setting. The user may choose to allow the automatic adjustment of the brightness setting, or the user may choose to change the automatic adjustment of the brightness setting to a different setting. The user's reaction to the automatic adjustments may be incorporated as an attribute to generate automatic adjustments in the future.

Alternately or additionally, employing automatic adjustments may also consider the presence of a second communication device located near a first communication device. For example, when a first user has set an alarm to go off at a certain time, automatic adjustment of the alarm setting may be employed when a second user is nearby and might be disturbed. The automatic adjustments of a setting at the first communication device may allow the first user's alarm to sound quietly at first, to potentially avoid disturbing the second user.

According to some embodiments described herein, implementing automatic adjustments at a communication device may be facilitated by local hardware and/or local software of the communication device. Alternately or additionally, implementing automatic adjustments at a communication device may be facilitated by a cloud computing system in cooperation with an application at the communication device. In these and other embodiments, automatic adjustments to settings may be implemented based on contextual data including environmental attributes, setting attributes, and user's reaction to the automatic adjustments.

Embodiments of the present invention will be explained with reference to the accompanying drawings.

Figure 1:
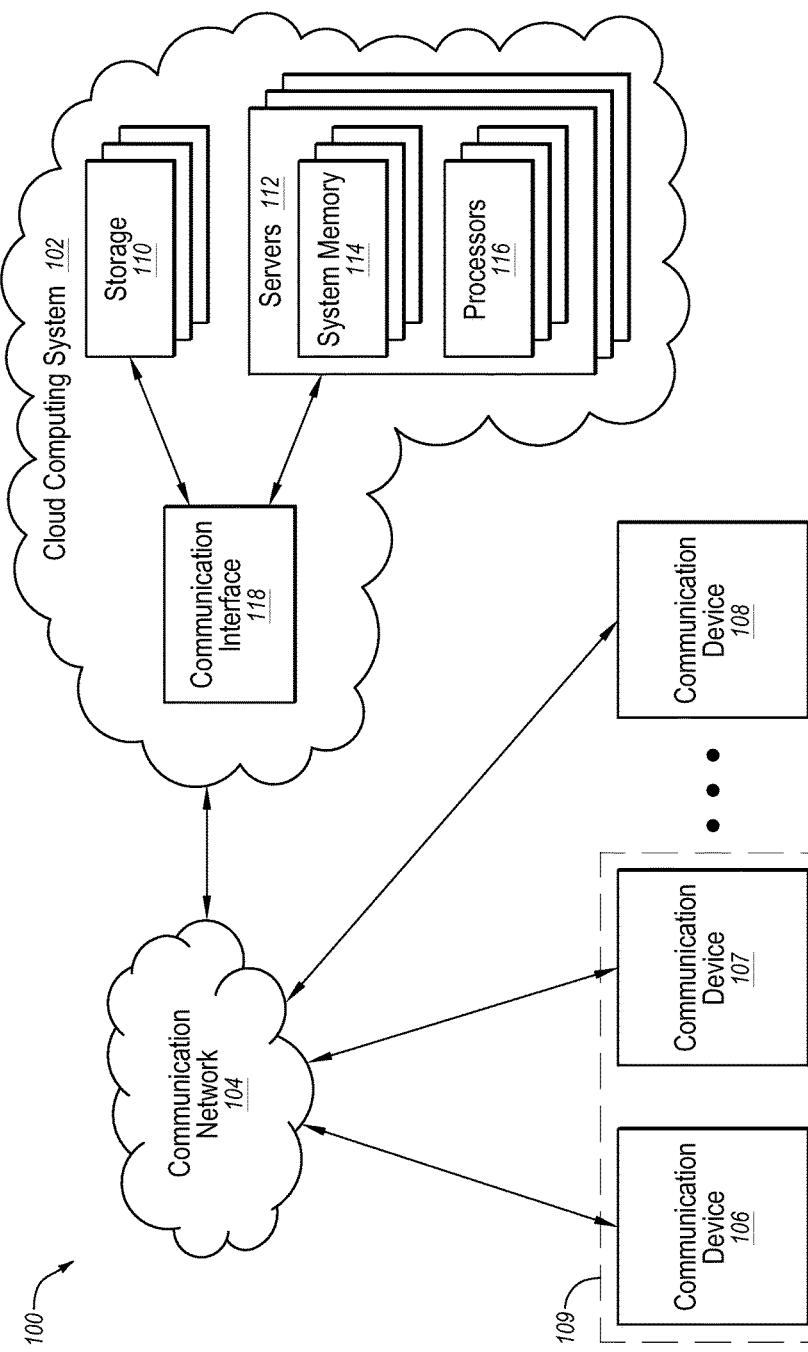
FIG. 1 illustrates an example operating environment in which a setting adjustment to a communication device may be implemented.

FIG. 1 illustrates an example operating environment 100 in which automatic adjustments to settings of a communication device may be accomplished in accordance with at least some embodiments described herein. The operating environment 100 may include a cloud computing system 102, a communication network 104, and one or more communication devices 106, 107, 108.

In general, the communication network 104 may include one or more wide area networks (WANs) and/or local area networks (LANs) that enable the cloud computing system 102 and the communication devices 106, 107, 108 to communicate with each other. In some embodiments, the communication network 104 includes the Internet, including a global internetwork formed by logical and physical connections between multiple WANs and/or LANs. Alternately or additionally, the communication network 104 may include one or more cellular RF networks and/or one or more wired and/or wireless networks such as, but not limited to, 802.xx networks, Bluetooth access points, wireless access points, IP-based networks, or the like. The communication network 104 may also include servers that enable one type of network to interface with another type of network.

Each of the communication devices 106, 107, 108 may include, but is not limited to: a mobile phone, a personal digital assistant (PDA), a personal music device such as an .mp3 player, a pager, an electronic book reader, or a tablet computer. Moreover, each of the communication devices 106, 107, 108 may include one or more sensors including, but not limited to: a photovoltaic sensor; an auditory sensor; a location sensor; a proximity sensor; an accelerometer; or a clock. In some embodiments, the communication devices 106, 107, 108 may also include communication interfaces, discussed in more detail below, to allow access to services provided by the cloud computing system 102. For example, each of the communication devices 106, 107, 108 may use a corresponding communication interface to provide contextual data to the cloud computing system 102. The cloud computing system 102 may receive the contextual data from the one or more communication devices 106, 107, 108, and provide setting adjustments to the one or more communication devices 106, 107, 108.

The cloud computing system 102 may include one or more hardware systems. Examples of such hardware systems may include, but are not limited to, one or more storage devices 110 and one or more servers 112. Each of the one or more servers 112 may include one or more system memory devices 114 and one or more processors 116. The cloud computing system 102 may additionally include a communication interface 118.

The storage devices 110 may include non-volatile storage such as magnetic storage, optical storage, solid state storage, or the like or any combination thereof. The storage devices 110 may be communicatively coupled to the communication interface 118.

As previously mentioned, the servers 112 may each include one or more system memory devices 114 and/or one or more processors 116 and may be configured to execute software to run and/or provide access to the cloud computing system 102, and/or to execute software that may be available in the cloud computing system 102 to the one or more communication devices 106, 107, 108.

The system memory devices 114 may include volatile storage such as random access memory (RAM). The memory devices 114 may have loaded therein programs and/or software that may be executed by the one or more processors 116 to perform one or more of the operations described herein, such as generation of content filtering.

The communication interface 118 of the cloud computing system 102 may be configured to receive contextual data from any of the communication devices 106, 107, 108, and/or to send predetermined setting(s) to any of the communication devices 106, 107, 108. The communication interface 118 may include, for example, a network interface card, a network adapter, a LAN adapter, or other suitable communication interface.

As already mentioned, the cloud computing system 102 may receive contextual data from one or more of the communication devices 106, 107, 108. The contextual data received at the cloud computing system 102 may include sensor data collected at one or more of the communication devices 106, 107, 108 indicating the conditions existing at the application of a first predetermined setting and a setting adjustment associated with the conditions. The contextual data received at the cloud computing system 102 may alternately or additionally include usage data collected at one or more of the communication devices 106, 107, 108 indicating the setting adjustment associated with the conditions.

The cloud computing system 102 may store the first contextual data at the storage device 110 coupled to the communication interface 118.

In some embodiments, the cloud computing system 102 may receive, at some future time, second contextual data from the communication device 106. Based on the second contextual data, the cloud computing system 102 may identify the existence of conditions at the communication device 106 that are similar to conditions indicated by the first contextual data. Accordingly, the cloud computing system 102 may then send the second predetermined setting to the communication device 106 so that the second predetermined setting may be applied at the communication device 106.

For example, the first predetermined setting may be a first predetermined brightness setting related to the brightness of a display at the communication device 106. The setting adjustment may be a brightness setting adjustment of the display under conditions indicated by the first contextual data, such as a particular level of ambient lighting in the room. The cloud computing system 102 may receive the first contextual data indicating the low level of ambient lighting associated with the first predetermined brightness setting and the brightness setting adjustment via the communication interface 118. The storage device 110 may store the first contextual data. Based on the first contextual data including the brightness setting adjustment, the cloud computing system 102 may generate a second predetermined setting to apply at the communication device in place of the first predetermined setting under conditions similar to conditions indicated by the first contextual data. The cloud computing system 102 may then, at some future time, receive second contextual data from the communication device 106 indicating conditions similar to the first contextual data such as the particular level of ambient lighting. The communication device 106 may apply the second predetermined brightness setting to adjust the brightness of the display at the communication device 106, in place of the first predetermined brightness setting.

Alternately or additionally, the first predetermined setting may be a first predetermined volume setting associated with an alarm feature of the communication device 106. The setting adjustment may be a volume setting adjustment. The first contextual data may indicate that the level of ambient sound is relatively low when the volume setting adjustment is made. The communication interface 118 may receive the first contextual data indicating the low level of ambient sound associated with the predetermined volume setting and the volume setting adjustment via the communication interface 118. Based on the first contextual data including the volume setting adjustment, the cloud computing system 102 may generate a second predetermined setting to apply at the communication device in place of the first predetermined setting under conditions similar to conditions indicated by the first contextual data. The cloud computing system 102 may then, at some future time, receive second contextual data from the communication device 106 indicating conditions similar to the first contextual data such as the low level of ambient sound. The second predetermined setting may be a second predetermined volume setting to be implemented at the communication device 106, in place of the first predetermined setting, when second contextual data indicates that the level of ambient sound is relatively low. Accordingly, the second predetermined volume setting may avoid disturbing a user of the communication device 106 when the ambient sound level is low by setting the volume of the alarm to be lower and gradually increase.

Alternately, the cloud computing system 102 may send the second predetermined setting to the communication device 106. The communication device 106 may then collect the second contextual data, e.g., from one or more sensors, at some future time. The communication device 106 may determine that the second contextual data indicates conditions matching the conditions indicated by the first contextual data. In response, the communication device 106 may apply the second predetermined setting at the communication device 106.

For example, the second predetermined setting may be related to the volume setting of an alarm feature of the communication device 106. The cloud computing system 102 may send the volume setting to the communication device 106. The communication device may then collect second contextual data indicating a low level of ambient sound. The communication device 106 may then determine that the low level of ambient sound matches conditions indicated by the first contextual data such as a similar level of ambient sound. In response, the communication device 106 may apply the second predetermined setting at the communication device 106. Accordingly, when similar conditions as indicated by the first contextual data are subsequently identified based on subsequent contextual data, the second predetermined setting may be automatically applied at the communication device 106.

Alternately or additionally, the communication interface 118 may be configured to receive data indicating a predetermined setting of a second communication device, such as the communication device 107, when the second communication device 107 is within a predetermined proximity of the communication device 106, as denoted at 109 in FIG. 1. The communication interface 118 may receive data indicating a predetermined setting of the second communication device 107. The processors 116 may generate a third predetermined setting, based on a priority determination between the first contextual data and the data indicating a predetermined setting of the second communication device 107, to apply at the first communication device 106 in place of the first predetermined setting.

For example, the first predetermined setting may be a volume setting of an alarm feature being set to announce an alarm at 5:30 a.m. at the first communication device 106. The first contextual data may indicate that the level of ambient sound is low compared to the volume setting of the alarm feature. The first contextual data may also indicate the presence of the second communication device 107 within the predetermined proximity of the first communication device 106. The communication interface 118 may also receive data indicating that an alarm feature of the second communication device 107 is set to announce an alarm at 6:00 a.m. The processor 116 may determine, based on a priority determination between an alarm of the first communication device 106 and the alarm of the second communication device 107, a third predetermined setting. The third predetermined setting may adjust the volume setting of the alarm feature at the first communication device 106 to be lower, at least initially, so as not to disturb a user of the second communication device 107.

By utilizing the cloud computing system 102, automated adjustments to a setting at one or more of the communication devices 106, 107, 108 may be processed at the cloud computing system 102. Thus, processing and/or other operations may be performed at the cloud computing system 102 in some embodiments.

Figure 2:
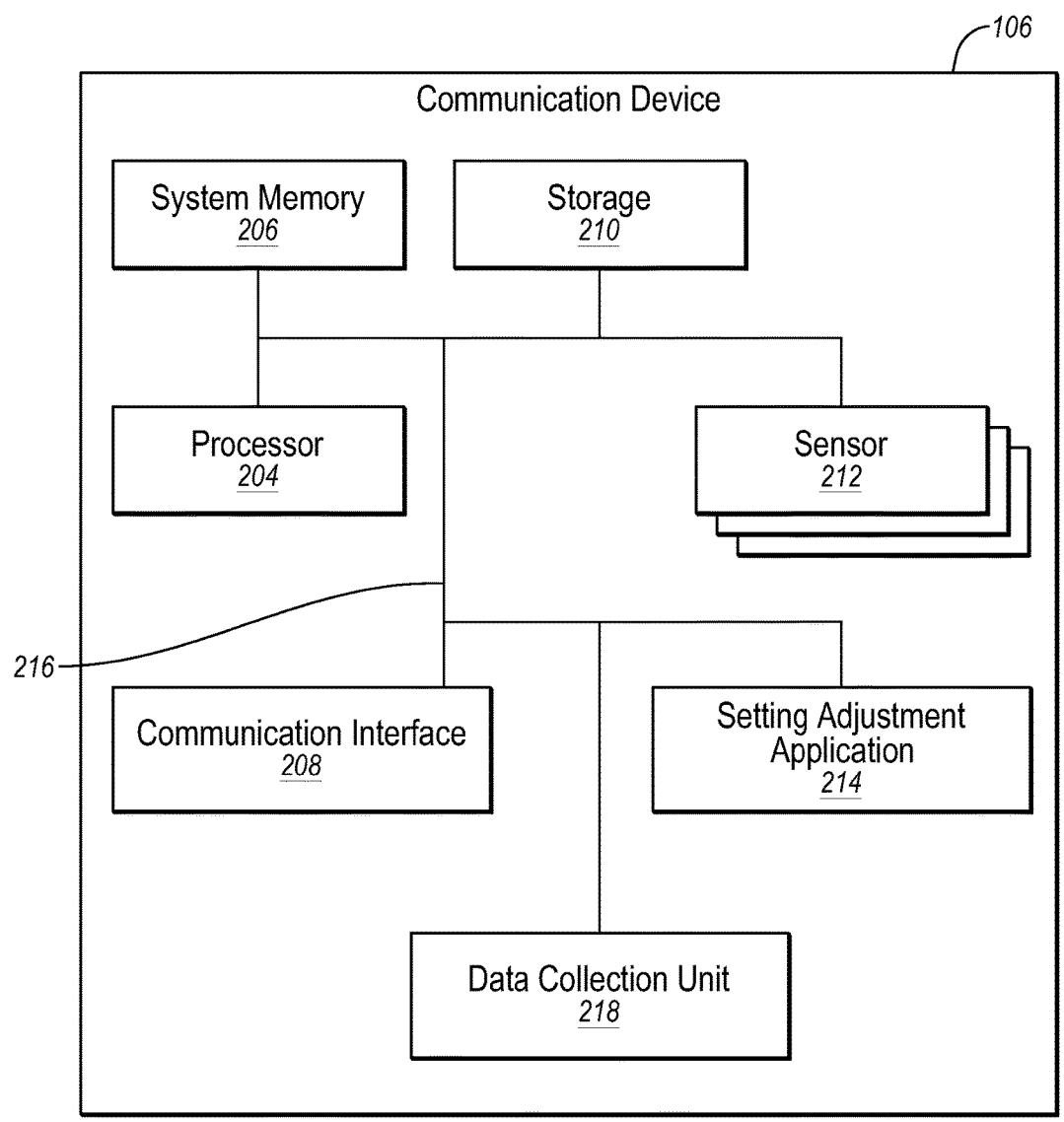
FIG. 2 is block diagram of an example embodiment of a communication device that may be implemented in the operating environment of FIG. 1.

FIG. 2 is a block diagram of an embodiment of the communication device 106 of FIG. 1, arranged in accordance with at least some embodiments described herein. One or more of the communication device 107 and communication device 108 may be similarly configured. The communication device 106 may include a processor 204 or other processing device, a system memory device 206, a communication interface 208, a storage device 210, one or more sensors 212, a setting adjustment application 214, a communication bus 216 configured to communicably couple the foregoing components together, and a data collection unit 218 configured to receive contextual data.

The processor 204 may be configured to perform one or more of the operations described herein, such as generating a predetermined setting as discussed in more detail below.

The system memory device 206 may include programs and/or software loaded therein that may be executed by the processor 204 to facilitate generation of a predetermined setting. Alternately or additionally, contextual data and/or other data may be loaded to the system memory device 206 during execution of the programs and/or software.

The communication interface 208 of the communication device 106 may be configured to provide contextual data to the cloud computing system 102 of FIG. 1, and/or may be otherwise configured to facilitate communication with the cloud computing system 102 and/or other communication devices 107, 108. Similar to the communication interface 118 of the cloud computing system 102 of FIG. 1, the communication interface 208 may include, for example, a network interface card, a network adapter, a LAN adapter, or other suitable communication interface.

The storage device 210 may include non-volatile storage such as magnetic storage, optical storage, solid state storage, or the like or any combination thereof.

The one or more sensors 212 may include, for example: a photovoltaic sensor; an auditory sensor; a location sensor; a proximity sensor; an accelerometer; and a clock.

The setting adjustment application 214 may include software, such as computer-readable instructions stored in the storage device 210 and/or loaded in the memory 206, that is executable by the processor 204 to change a first predetermined setting to a second or different predetermined setting.

The data collection unit 218 may be configured to receive contextual data generated at the communication device 106 by, e.g., the sensors 212. The data collection unit 218 may be included in the system memory device 206, for example. The contextual data may indicate conditions existing at the communication device 106 at application of the first predetermined setting and a setting adjustment associated with the conditions.

The contextual data may include sensor data, e.g., from the sensors 212, indicating conditions existing at the communication device 106 at application of the predetermined setting. The contextual data may alternately or additionally include usage data indicating setting adjustments associated with the conditions. The data collection unit 218 may provide the first contextual data to the processor 204.

The processor 204 may be configured to generate a second predetermined setting, based on the setting adjustment, to apply to the communication device 106 in place of the first predetermined setting under conditions indicated by subsequent contextual data, or second contextual data, which are similar to conditions indicated by the first contextual data. In some embodiments, the second predetermined setting may correspond to the setting adjustment. Accordingly, when the processor 204 subsequently identifies, based on subsequent contextual data, similar conditions as indicated by the first contextual data, the second predetermined setting may be automatically applied at the communication device 106.

For example, the first predetermined setting may be a first predetermined brightness setting related to the brightness of a display of the communication device 106. The setting adjustment may be a brightness setting adjustment of the display under conditions indicated by the first contextual data, such as a particular level of ambient lighting in the room. The data collection unit 218 may receive the first contextual data indicating the particular level of ambient lighting associated with the first predetermined brightness setting and the brightness setting adjustment via the one or more sensors 212. The storage device 210 may store the first contextual data. Based on the first contextual data including the brightness setting adjustment, the communication device 106 may generate a second predetermined setting to apply at the communication device in place of the first predetermined setting under conditions similar to conditions indicated by the first contextual data. The communication device 106 may then, at some future time, receive second contextual data via the one or more sensors 212 indicating conditions similar to the first contextual data such as the particular level of ambient lighting. The processor 204 may generate a second predetermined brightness setting to apply at the communication device 106. The communication device 106 may apply the second predetermined brightness setting to adjust the brightness of the display at the communication device 106, in place of the first predetermined brightness setting.

Alternately or additionally, the first predetermined setting may be a first predetermined volume setting associated with an alarm feature of the communication device 106. The setting adjustment may be a volume setting adjustment. The first contextual data may indicate, via the one or more sensors 212, that the level of ambient sound is relatively low when the volume setting adjustment is made. The data collection unit 218 may receive the first contextual data indicating the relatively low level of ambient sound associated with the predetermined volume setting and the volume setting adjustment. Based on the first contextual data including the volume setting adjustment, the communication device 106 may generate a second predetermined setting to apply at the communication device 106 in place of the first predetermined setting under conditions similar to conditions indicated by the first contextual data. The communication device 106 may then, at some future time, receive second contextual data from the one or more sensors 212 indicating conditions similar to the first contextual data such as a relatively low level of ambient sound. The second predetermined setting may be a second predetermined volume setting to be implemented at the communication device 106, in place of the first predetermined setting, when second contextual data indicates that the level of ambient sound is relatively low as previously indicated by the first contextual data. Accordingly, the second predetermined volume setting may avoid disturbing a user of the communication device 106 when the ambient sound level is relatively low by setting the volume of the alarm to be lower and gradually increase.

Alternately, the communication device 106 may send, e.g., via the communication interface 208, the first contextual data to the cloud computing system 102. The data collection unit 216 may then collect the second contextual data, e.g., from one or more sensors 212, at some future time, and may send the second contextual data to the cloud computing system 102. The cloud computing system 102 may determine that the second contextual data indicates conditions matching the conditions indicated by the first contextual data. The cloud computing system 102 may send the second predetermined setting to the communication device 106. In response, the communication device 106 may apply the second predetermined setting at the communication device 106.

For example, the first contextual data may be related to the volume setting of an alarm feature of the communication device 106. The communication device 106 may send, e.g., via the communication interface 208, the first contextual data to the cloud computing system indicating a relatively low level of ambient sound. The data collection unit 216 may collect the second contextual data from the one or more sensors 212 indicating the relatively low level of ambient sound. The cloud computing system 102 may then determine that the relatively low level of ambient sound of the second contextual data matches conditions indicated by the first contextual data. The cloud computing system 102 may then generate a second predetermined volume setting and send the second predetermined volume setting to the communication device 106. In response, the communication device 106 may apply the second predetermined setting at the communication device 106.

Alternately or additionally, the communication interface 208 may be configured to receive data indicating a second communication device 107 is within a predetermined proximity of the first communication device 106, as denoted at 109 in FIG. 1. The communication interface 208 may receive data indicating a predetermined setting of the second communication device 107. The processor 204 may generate a third predetermined setting, based on a priority determination between the first contextual data and the data indicating a predetermined setting of the second communication device 107, to apply at the first communication device 106 in place of the first predetermined setting.

For example, the first predetermined setting may be a volume setting of an alarm feature being set to announce an alarm at 5:30 a.m. at the first communication device 106. The first contextual data may indicate that the level of ambient sound is low compared to the volume setting of the alarm feature. The first contextual data may also indicate the presence of the second communication device 107 within the predetermined proximity of the first communication device 106. The communication interface 208 may also receive data indicating that an alarm feature of the second communication device 107 is set to announce an alarm at 6:00 a.m. The processor 204 may determine, based on a priority determination between the alarm of the first communication device 106 and the alarm of the second communication device 107, a third predetermined setting. The third predetermined setting may adjust the volume setting of the alarm feature at the first communication device 106 to be lower, so as not to disturb a user of the second communication device 107.

Alternately or additionally, all audible announcement features of the first communication device 106 may be disabled when the second communication device 107 is within the predetermined proximity. For example, the user of the first communication device 106 may attend a piano lesson taught by a second user of the second communication device 107. The first communication device 106 may have a first predetermined setting to announce incoming communications, such as a ring for a telephone call. However, the user of the second communication device 107 may have a predetermined setting to silence all telephone call rings associated with other communication devices in its proximity. In these and other embodiments, the third predetermined setting may silence any telephone call rings based on a priority determination between the first predetermined ring setting of the first communication device 106, and the predetermined setting of the second communication device 107. Accordingly, disturbances during the piano lesson can be automatically avoided by applying the third predetermined setting at the first communication device 106 when conditions indicate that the second communication device 107 is within the predetermined proximity.

Alternately or additionally, the communication interface 208 of the first communication device 106 may be configured to provide third contextual data collected by the data collection unit 218 to the cloud computing system 102. The third contextual data may indicate conditions existing at the application of a third predetermined setting of the communication device 106 and a setting adjustment associated with the conditions. The communication interface 208 of the communication device 106 may be further configured to receive a fourth predetermined setting generated by the cloud computing system 102. The fourth predetermined setting may be based on the setting adjustment to the third predetermined setting. The setting adjustment application 214 may then apply the fourth predetermined setting at the communication device 106 in place of the third predetermined setting under conditions indicated by a fourth contextual data that are similar to conditions indicated by the third contextual data. Accordingly, embodiments described herein contemplate determining automated settings adjustments, e.g., predetermined settings, to apply at the communication device 106 locally at the communication device 106 and/or remotely at the cloud computing system 102.

Figure 3:
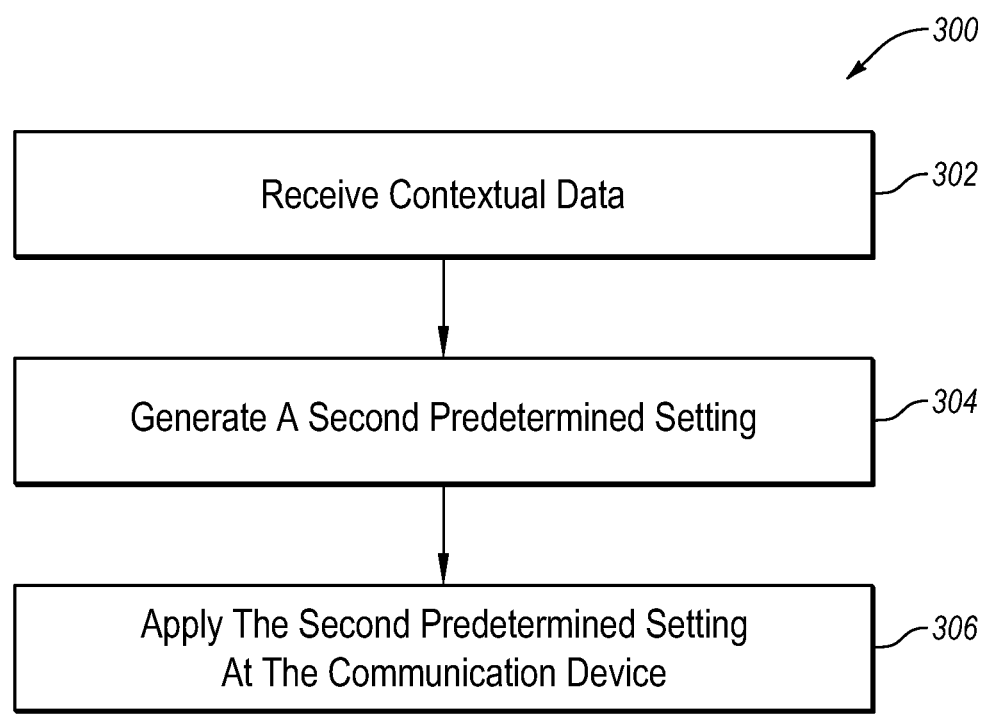
FIG. 3 is a flowchart of an example method of generating a setting adjustment to be applied to a communication device.

FIG. 3 is a flowchart of an example method 300 to effect automated adjustments at a communication device, arranged in accordance with at least some embodiments described herein. In some embodiments, the method 300 may be performed in whole or in part by a cloud computing system, such as the cloud computing system 102 of FIG. 1. Alternately or additionally, the method 300 may be performed in whole or in part by a communication device, such as the communication device 106 of FIG. 1.

The method 300 may begin at block 302 in which the first contextual data is received. The first contextual data may be received by, e.g., the data collection unit 218 of the communication device 106, or by the communication interface 118 of the cloud computing system 102. As already explained herein, the first contextual data may indicate conditions of a first predetermined setting at a communication device and a setting adjustment associated with the conditions.

The method 300 may continue at block 304 in which a second predetermined setting is generated based on the setting adjustment. The second predetermined setting may be configured to be applied at the communication device in place of the first predetermined setting under conditions that are similar to conditions indicated by the first contextual data.

The method 300 may continue at block 306 in which the second predetermined setting is applied at the communication device in place of the first predetermined setting. The second predetermined setting may be applied in response to receiving second contextual data indicating conditions that are similar to conditions indicated by the first contextual data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the communication device may be a first communication device, such as the communication device 106 of FIG. 1. Although not illustrated in FIG. 3, the method 300 may further include receiving data indicating a predetermined setting of a second communication device, such as the communication device 107. As explained above, when the second communication device is within a predetermined proximity of the first communication device, the predetermined setting of the second communication device may be received by a data collection unit of the first communication device. Alternately or additionally, the predetermined setting may be received by a communication interface of a cloud computing system.

The method 300 may further include generating a third predetermined setting based on a priority determination between the first contextual data and the data indicating a predetermined setting of the second communication device. The third predetermined setting may be generated locally at the first communication device or remotely at the cloud computing system, for example.

The method 300 may further include applying the third predetermined setting at the first communication device in place of the first predetermined setting. The third predetermined setting may be applied by, e.g., a setting adjustment application executed by a processor of the first communication device.

The contextual data described with respect to the method 300 may include sensor data indicating conditions existing at application of a predetermined setting. The contextual data may alternately or additionally include usage data indicating setting adjustments associated with the conditions.

The method 300 may further include storing the second predetermined setting and the conditions indicated by the first contextual data on a cloud computing system. Alternately or additionally, the method 300 may further include storing the predetermined setting of the second communication device 107 and the third predetermined setting on a cloud computing system.

Figure 4:
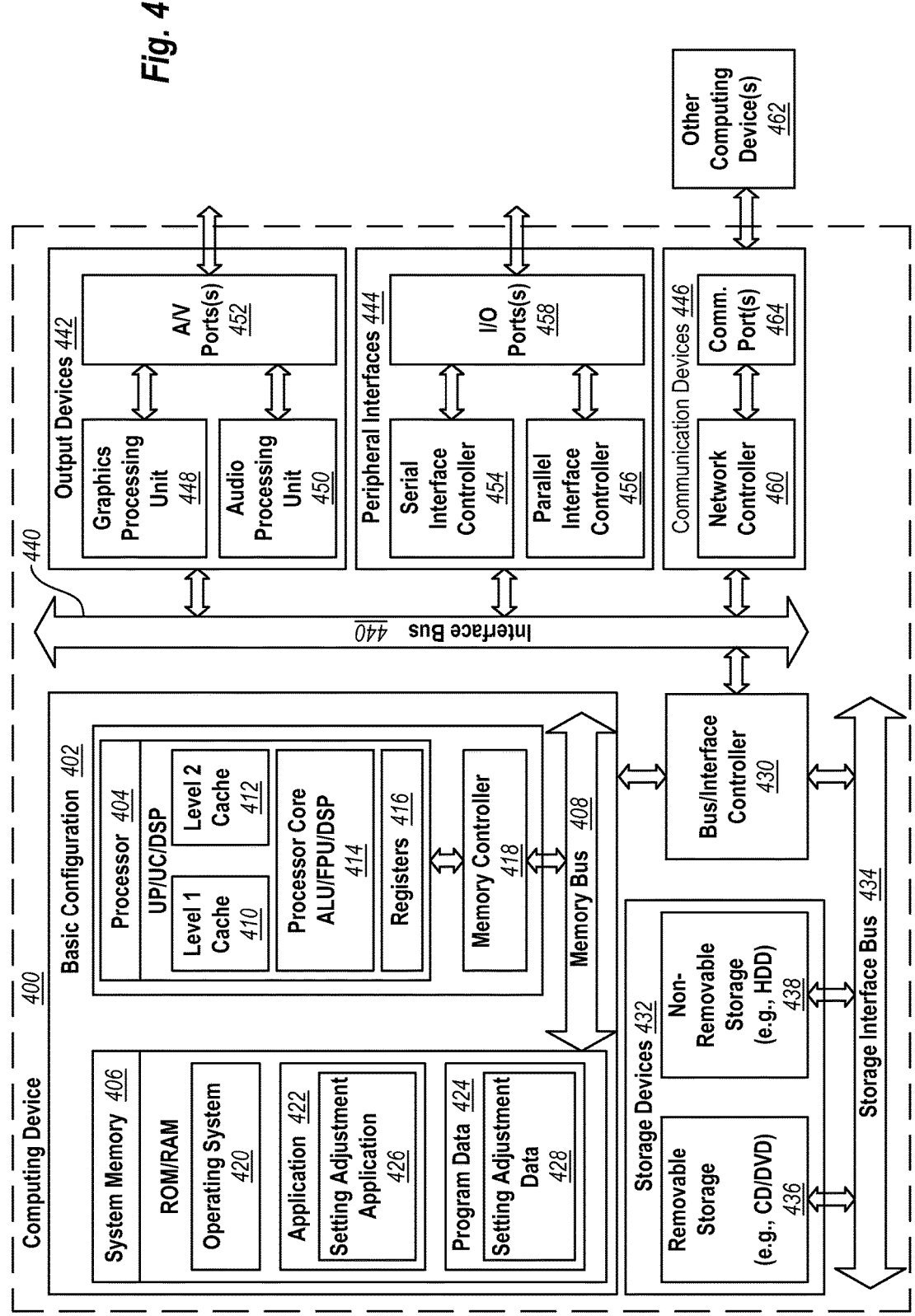
FIG. 4 is a block diagram of an example embodiment of a computing device that may be implemented to generate and/or apply setting adjustments, all arranged in accordance with at least some of the embodiments described herein.

FIG. 4 is a is a block diagram illustrating an example computing device 400 that is arranged for effecting automated adjustments to a communication device in accordance with the present disclosure. The computing device 400 may correspond to one or more of the communication devices 106, 107, 108 or servers 112 of FIG. 1, for example. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a setting adjustment application 216 that is arranged to cooperate with other components of the communication device 106 or the cloud computing system 102 to effect automated adjustments according to the embodiments discussed above. Program data 424 may include setting adjustment data 428 that may be useful for effecting automated adjustments to one or more communication devices 106, 107, 108 as is described above. For example, the setting adjustment data 428 may include one or more predetermined settings, including default settings and/or new settings generated as described herein. In some embodiments, application 422 may be arranged to operate with program data 424 on operating system 420 such that implementations of automatic setting adjustments may be provided as described herein.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a communication device, such as the communication device 106 in FIG. 1. The communication device 106 may be a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a portion of a cloud computing system, such as the cloud computing system 102 in FIG. 1.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present inventions have been described in detail, it should be understood that the various changes, substitutions, and alterations could be made hereto without departing from the spirit and scope of the invention.

What is claimed is:

1. A first communication device that is configured to receive one or more predetermined settings configured to alter a physical operating parameter and in response to receipt of the predetermined settings, to alter a physical operating parameter of a physical component of the first communication device, the first communication device comprising:

a non-transitory memory that includes a data collection unit configured to receive first contextual data at the first communication device, the first contextual data indicating first conditions that exist at application of a first predetermined setting and a first setting adjustment associated with the first conditions; and a processor configured to generate a second predetermined setting that is based on the first setting adjustment to a physical component of the first communication device, the second predetermined setting to be applied to the physical component of the first communication device in place of the first predetermined setting under second conditions indicated by second contextual data that match the first conditions, wherein:

the data collection unit is further configured to receive data indicating a second communication device is within a predetermined proximity of the first communication device and indicating a predetermined setting of the second communication device;

the processor is further configured to:

determine a priority between the first predetermined setting of the first communication device and the predetermined setting of the second communication device;

in response to the priority of the predetermined setting of the second communication device being higher than the first predetermined setting of the first communication device, generate a third predetermined setting configured to be applied to the physical component of the first communication device in place of the first predetermined setting in response to the second contextual data matching the first conditions; and in response to the second conditions being indicated by the second contextual data matching the first conditions, apply the third predetermined setting to the physical component of the first communication device in place of the second predetermined setting to alter a physical operating parameter of the physical component; and the physical component includes one of: a display and the third predetermined setting includes a brightness adjustment; an alarm and the third predetermined setting includes an adjustment of an alarm feature; or a ringer and the third predetermined setting includes silencing the ringer.

2. The first communication device of claim 1, wherein the first contextual data comprises:

sensor data indicating the first conditions existing at application of the first predetermined setting; and usage data indicating setting adjustments associated with the first conditions, the setting adjustments including the first setting adjustment.

3. The first communication device of claim 2, further comprising one or more sensors configured to collect the sensor data.

4. The first communication device of claim 3, wherein the one or more sensors comprise at least one of:

a photovoltaic sensor;
an auditory sensor;
a location sensor;
a proximity sensor;
an accelerometer; and
a clock.

5. The first communication device of claim 1, further comprising a communication interface configured to provide the first contextual data and the data indicating the predetermined setting of the second communication device to a cloud computing system.

6. The first communication device of claim 1, further comprising:

a communication interface configured to provide third contextual data collected by the data collection unit to a cloud computing system, the third contextual data indicating third conditions existing at application of a fourth predetermined setting at the first communication device and a second setting adjustment associated with the third conditions, and to receive a fifth predetermined setting generated by the cloud computing system, based on the second setting adjustment to the fourth predetermined setting, to apply at the first communication device in place of the fourth predetermined setting under fourth conditions indicated by fourth contextual data that match the third conditions indicated by the third contextual data.

7. The first communication device of claim 1, wherein:

the first predetermined setting comprises a first alarm time setting and an alarm volume setting of the first communication device;

the data indicating the predetermined setting of the second communication device comprises a second alarm time setting of the second communication device;

the third predetermined setting comprises an adjustment of the alarm volume setting of the first communication device;

the priority between the first predetermined setting and the predetermined setting of the second communication device includes a priority between the first alarm time setting of the first communication device and the second alarm time setting of the second communication device; and the processor is configured to generate the third predetermined setting based on the priority between the first alarm time setting of the first communication device and the second alarm time setting of the second communication device.

8. The first communication device of claim 1, wherein:

the first predetermined setting comprises a first audible alert setting of the first communication device;

the data indicating the predetermined setting of the second communication device comprises a second audible alert setting of the second communication device;

the priority between the first predetermined setting and the predetermined setting of the second communication device includes a priority between the first audible alert setting of the first communication device and the second audible alert setting of the second communication device; and the processor is configured to generate the third predetermined setting based on the priority between the first audible alert setting of the first communication device and the second audible alert setting of the second communication device when the second communication device is within the predetermined proximity of the first communication device.

9. A cloud computing system, comprising:

a communication interface that is configured to receive first contextual data from a first communication device external to the cloud computing system, the first contextual data indicating first conditions that exist at application of a first predetermined setting and a first setting adjustment of a physical component of the first communication device associated with the first conditions;

a storage device that is coupled to the communication interface and configured to store the first contextual data; and a processing device that is configured to generate a second predetermined setting that is based on the first setting adjustment to the physical component of the first communication device, the second predetermined setting to be applied to the physical component of at the first communication device in place of the first predetermined setting under second conditions indicated by second contextual data that match the first conditions, wherein: the communication interface is further configured to receive data indicating a second communication device is within a predetermined proximity of the first communication device and indicating a predetermined setting of a second communication device;

the storage device is further configured to store the predetermined setting of the second communication device;

the processing device is further configured to:

determine a priority between the first predetermined setting of the first communication device and the predetermined setting of the second communication device;

in response to the priority of the predetermined setting of the second communication device being higher than the first predetermined setting of the first communication device, generate a third predetermined setting configured to be applied to the physical component of at the first communication device in place of the first predetermined setting in response to the second contextual data matching the first conditions; and in response to the second conditions being indicated by the second contextual data matching the first conditions, apply the third predetermined setting to the physical component of the first communication device in place of the second predetermined setting to alter a physical operating parameter of the physical component; and the physical component includes one of: a display and the third predetermined setting includes a brightness adjustment; an alarm and the third predetermined setting includes an adjustment of an alarm feature; or a ringer and the third predetermined setting includes silencing the ringer.

10. The cloud computing system of claim 9, wherein the first contextual data comprises:

sensor data indicating the first conditions existing at application of the first predetermined setting; and usage data indicating setting adjustments associated with the first conditions, the setting adjustments including the first setting adjustment.

11. The cloud computing system of claim 10, wherein the first communication device comprises one or more sensors configured to collect the sensor data.

12. The cloud computing system of claim 11, wherein the one or more sensors comprise at least one of:

a photovoltaic sensor;
an auditory sensor;
a location sensor;
a proximity sensor;
an accelerometer; and
a clock.

13. A method to effect automated adjustments of a physical operating parameter of a physical component of a first communication device, the method comprising:

receiving, by one or more processors, first contextual data indicating first conditions that exist at application of a first predetermined setting at the first communication device and a first setting adjustment associated with the first conditions;

generating, by the one or more processors, a second predetermined setting that is based on the first setting adjustment to a physical component of the first communication device, the second predetermined setting to be applied to the physical component of the first communication device in place of the first predetermined setting under second conditions indicated by second contextual data that match the first conditions;

receiving, by the one or more processors, data indicating a second communication device is within a predetermined proximity of the first communication device and indicating a predetermined setting of a second communication device;

determining, by the one or more processors, a priority between the first predetermined setting of the first communication device and the predetermined setting of the second communication device;

in response to the priority of the predetermined setting of the second communication device being higher than the first predetermined setting of the first communication device, generating by the one or more processors, a third predetermined setting configured to be applied to the physical component of the first communication device in place of the second predetermined setting in response to the second contextual data matching the first conditions; and in response to the second conditions being indicated by the second contextual data matching the first conditions, applying the third predetermined setting to the physical component the first communication device in place of the second predetermined setting to alter a physical operating parameter of the physical component, wherein:

the physical component includes one of: a display and the third predetermined setting includes a brightness adjustment; an alarm and the third predetermined setting includes an adjustment of an alarm feature; or a ringer and the third predetermined setting includes silencing the ringer.

14. The method of claim 13, wherein the first contextual data comprises:

sensor data indicating the first conditions existing at application of the first predetermined setting; and usage data indicating setting adjustments associated with the first conditions, the setting adjustments including the first setting adjustment.

15. The method of claim 13, further comprising storing the predetermined setting of the second communication device and the third predetermined setting on a cloud computing system.

16. The method of claim 13, further comprising storing the second predetermined setting and the first conditions indicated by the first contextual data on a cloud computing system.

* * * * *